May 21, 1935.  F. W. PULLEN  2,001,745
BUMPER FOR CARPET SWEEPERS
Filed Jan. 8, 1932
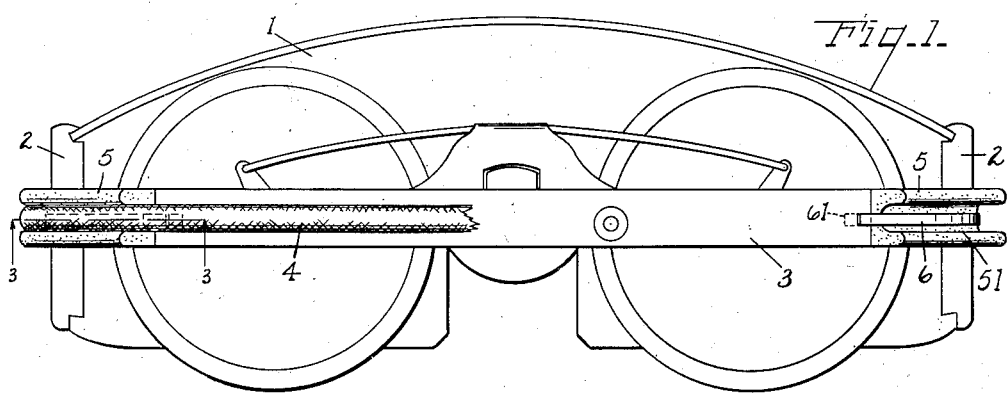
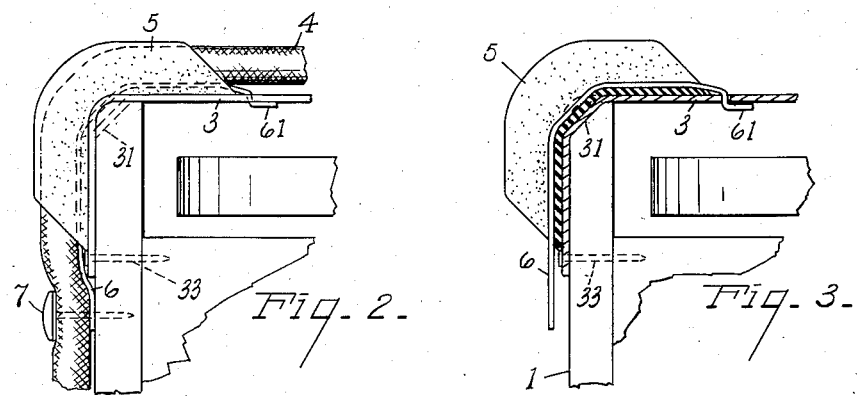
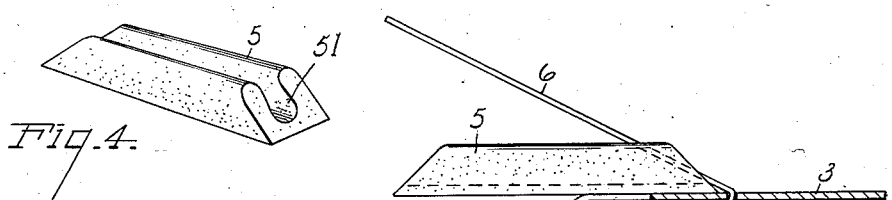
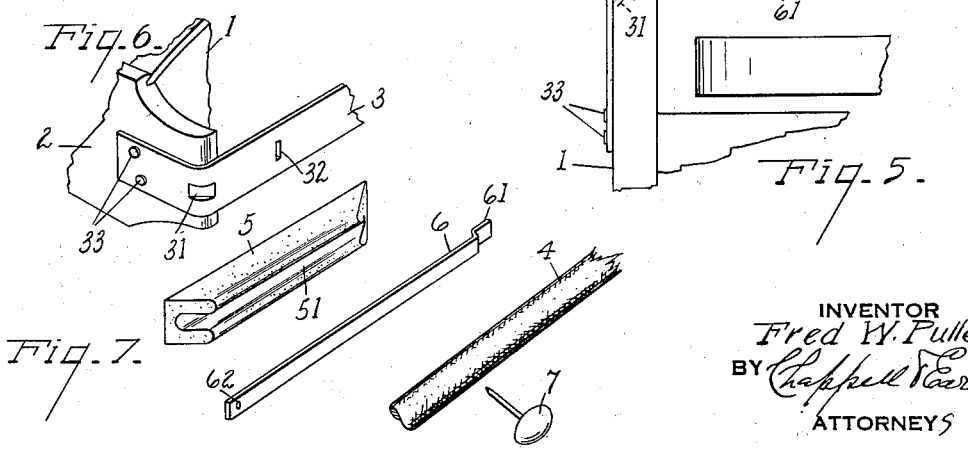
INVENTOR
Fred W. Pullen
BY
ATTORNEYS Patented May 21, 1935

2,001,745

UNITED STATES PATENT OFFICE 2,001,745

BUMPER FOR CARPET SWEEPERS

Fred W. Pullen, Grand Rapids, Mich., assignor to Bissell Carpet Sweeper Co., Grand Rapids, Mich.

Application January 8, 1932, Serial No. 585,422

4 Claims. (Cl. 15—45)

The objects of the invention are:

First, to improve such a structure generally.

Second to provide an improved corner structure for such a bumper.

Third, to provide improved means for retaining the corner structure in place.

Further objects and objects pertaining to details and economies will appear from the description to follow. A preferred embodiment of my invention is illustrated in the accompanying drawing, in which:

Fig. 1 is an end elevation view of a carpet sweeper with my improved bumper in place, the bumper being broken away to expose the right hand corner in detail, the handle being omitted.

Fig. 2 is an enlarged detail inverted plan view of the left hand corner of Fig. 1.

Fig. 3 is a similar view in section on line 3—3 of Fig. 1.

Fig. 4 is an enlarged detail view of the corner bumper as it appears in the straight bar.

Fig. 5 is a detail inverted plan view showing the method of applying the corner and of securing the same in place.

Fig. 6 is a detail perspective view of the corner of the carpet sweeper before the bumper is attached.

Fig. 7 details in separate relation the bumper corner, the retaining clip, the bumper cord and the attaching nail.

The parts will be identified by their numerals of reference which are the same in all the views.

1 is the case of the carpet sweeper. 2, 2 are the side bars therefor. 3 is the end bar of thin metal. 4 is the bumper cord, a braided cord preferably, which extends entirely around the carpet sweeper case. 5 is the rubber bumper corner. 6 is the attaching clip therefor. 7 is the securing nail.

The bumper cord 4 is disposed around the carpet sweeper in the usual way, being the usual braided cord or cord with a braided cover. 5 is the rubber corner which is formed in continuous length as a channel bar with a central groove 51, in which the cord 4 is to be disposed. Appropriate lengths like that in Fig. 4 are cut off on the bevel. The metal end bar 3 is indented at 31 at the corner to serve as a retaining means for the corner block. It is also perforated at 32 for the insertion of the hook or engaging lug 61 at the end of the retainer 6. The corner 5 is put in place, the end 61 of the clip 6 is inserted in the aperture 32, and wrapped around the corner, engaging the longitudinal groove 51 in the corner block 5, causing it to engage in the depressed part 31. When the clip 6 is forced around to position, the bumper cord 4 is also put in position in the groove and the whole is retained by the round headed attaching nail 7, which is inserted through the cord into the hole 62 in clip 6. In this way, the corner is effectively clipped and retained in place, the nail that secures the same doing double duty in retaining the buffer cord as well as the corner clip.

It will be observed that it is unnecessary to provide any molded part to make this corner. A straight length of channel rubber bar is produced and cut off at a proper angle and retained in place by the clip and the mere insertion of a single nail.

While the structure is superior to any with which I am familiar, it is far more economical to construct. I wish to claim the entire structure specifically and I also desire to claim the particular corner construction and the retaining means.

Having thus described my invention, what I claim as new and desire to secure by Letters Patent is:

1. In a corner bumper for carpet sweepers, the combination with a naturally straight resilient member of U-cross section, of a metallic strap engaging the web of said member and secured at its ends to the case of the sweeper, the sweeper case having a transverse corner notch or indentation into which said member is forced by said strap.

2. In a corner bumper for carpet sweepers, the combination with a naturally straight resilient member of U-cross section, of means securing the web of said member to the case of the sweeper, the sweeper case having a transverse corner notch or indentation into which the normally flat web of said member is forced by said means.

3. In a bumper structure for carpet sweepers, the combination of a carpet sweeper case having side bars and metallic strap end bars with indented corners, a corner bumper block formed of a straight bar of rubber material having a longitudinal channel open at its outer side and bent around the corner, a clip bar having a hooked end engaging a perforation in the said metal end bar disposed in the channel and wrapped around said corner block to bend and to retain the same in place, a buffer cord disposed around the same and in said channel, and a retaining nail through the said buffer cord and the end of the clip, the clip bar being stretched so tight that the normally flat face of the bumper block is forced into the corner indentation.

4. In a bumper structure for carpet sweepers, the combination of a carpet sweeper case having side bars and metallic strap end bars with indented corners, a corner bumper block formed of a straight bar of rubber material having a longitudinal channel open at its outer side and bent around the corner, a clip bar having a hooked end engaging a perforation in the said metal end bar disposed in the channel and wrapped around said corner block to retain the same in place, and a retaining nail through the end of the clip, the clip bar being stretched so tight that the normally flat face of the bumper block is forced into the corner indentation.

FRED W. PULLEN.